United States Patent Office 2,935,481
Patented May 3, 1960

2,935,481

WATER-SOLUBLE FLUORESCENT DYE-COATED HYDROPHOBIC SILICA AND PROCESS OF MAKING THE SAME

Carroll A. Hochwalt, St. Louis, Mo., assignor to Monsanto Chemical Company, St. Louis, Mo., a corporation of Delaware No Drawing. Application April 20, 1955
Serial No. 502,736

6 Claims. (Cl. 252—301.3)

The present invention relates to new compositions of matter comprising silica material, and it more particularly relates to novel compositions of matter comprising a hydrophobic silica.

It is one object of this invention to provide a novel composition of matter containing a silica material.

It is a further object of this invention to provide a novel composition of matter containing a hydrophobic silica which is light in weight and which may be used as a visual marker on large bodies of water to designate the location of a particular object.

Still further objects and advantages of this invention will be apparent from the following description and the appended claims.

The present invention provides a solid composition of matter comprising a silica material in combination with a water-soluble fluorescent or luminescent material such as a water-soluble fluorescent dye. In a preferred embodiment of this invention the composition comprises a hydrophobic silica, particularly a hydrophobic silica which floats on the surface of water or aqueous solutions, in a combination with a water-soluble fluorescent dye. The hydrophobic silica employed may be prepared in various ways and various forms of silica may be used. One suitable form of hydrophobic silica is a hydrophobic silica aerogel. Such a material may be prepared by treating a normally hydrophilic silica aerogel, for example, a silica aerogel produced in accordance with the procedures given in U.S. Patent No. 2,188,007 issued to Samuel S. Kistler, patented January 23, 1940, with the vapors of one of the methyl chloro-silicanes, followed, if necessary, by treatment with a stream of air or ammonia to remove hydrogen chloride. Such a procedure is described in greater detail in U.S. Patent No. 2,589,705 issued to Samuel S. Kistler, patented March 18, 1952. A hydrophobic silica such as hydrophobic diatomaceous earth may also be used. A material of this type may be produced by treating a normally hydrophilic diatomaceous earth or a silica in different physical form with a tertiary carbinoxy chlorosilane or a tertiary-alkoxy chlorosilane, for example, according to the procedure described in U.S. Patent No. 2,668,151, issued to George Wesley Pedlow, Jr., et al., patented February 2, 1954. Another hydrophobic silica which may be used is a hydrophobic estersil comprising a super colloidal substrate of amorphous silica coated with —OR groups, the substrate having a specific surface of from 1 to 900 square meters per gram, there being in the —OR group coating, chemically bound to the silica, at least 200 —OR groups per 100 square millimicrons of substrate surface area, and R being a hydrocarbon radical of from 2 to 18 carbon atoms wherein the carbon attached to oxygen is also attached to hydrogen. Such hydrophobic estersils and processes of preparing them are described in greater detail in U.S. Patent No. 2,657,149 issued to Ralph K. Iler, patented October 27, 1953.

In the compositions of this invention the hydrophobic silica serves as a carrier for the water-soluble fluorescent dye which may be present as a mere surface coating or as an absorbed or adsorbed coating. In any event the dye is sufficiently bound to the silica so that it is released at a slow rate when the hydrophobic silica containing the dye is placed in or on an aqueous solution. Thus, the dye dissolves relatively slowly from the surface of the silica.

A wide variety of water-soluble fluorescent or luminescent dyes may be used in combination with the hydrophobic silica. As examples of such dyes may be mentioned the water-soluble fluorescent Xanthene dyes, the water-soluble fluorescent Rosamine dyes, the water-soluble fluorescent Rhodamine dyes, the water-soluble fluorescent Rhodols dyes and the water-soluble fluorescent Acridine dyes and the like. Specific examples of such dyes are given in the following table showing the commercial name, the color index numbers according to the Society of Dyers and Colourists and Schulz's Farbstofftabellen, and the color of fluorescence in water solution.

| Trade Name | Color of Fluorescence in Water | Society of Dyers and Colourists | Schulz's Farbstofftabellen |
|---|---|---|---|
| Pyronine G | Yellow | 739 | 568 |
| Acridine Red 3B | Greenish-Yellow | 740 | 569 |
| Pyronine B | Redder than Pyronine G | 741 | |
| Urbine E | Yellowish Orange | 742 | |
| Rhodamine S | Yellow | 743 | 570 |
| Rosamine | Yellowish-Red | 745 | |
| Rhodamine 5G | Yellow | 746 | |
| Sulphurein | Yellowish-Red | 747 | |
| Rhodamine B | Bluish-Red | 749 | 573 |
| Rhodamine G | Vermillion | 750 | 572 |
| Rhodamine 2B | Brownish-Red | 751 | 574 |
| Rhodamine 6G | Green | 752 | 571 |
| Rhodamine 3G | Brown | 753 | 576 |
| Fast Acid Eosine G | Green | 756 | 581 |
| Chromorhodine B | Yellow | 762 | |
| Fluorescein | Greenish-Yellow | 766 | 585 |
| Chrysoline | Green | 767 | 586 |
| Eosine YS | do | 768 | 587 |
| Eosine BS | do | 771 | 590 |
| Phloxine | Greenish-Yellow | 774 | 593 |
| Phloxine B | Dark Green | 778 | 596 |
| Cyanosine B | Yellow | 780 | 598 |
| Acridine Yellow GR | Green | 785 | 602 |
| Auracine G | do | 786 | |
| Coriphosphine O | Yellowish-Green | 787 | |
| Acridine Orange L | Green | 788 | 603 |
| Acriflavine | do | 790 | |
| Benzoflavine | do | 791 | 605 |
| Phosphine | do | 793 | 606 |
| Fast Phosphine NAL | do | 795 | 607 |
| Flaveosine | do | 796 | |

The above table is intended to illustrate some of the dyes which may be used, but is not intended to be an exhaustive list as many more water-soluble fluorescent dyes are known and would also be suitable for the uses herein described. The dye, however, should be soluble in water to the extent of at least 1% by weight at 5° C.

The end use of the composition will govern the selection of a particular dye to a considerable extent. Thus, if the composition is used as a sea-marker, that is, to enhance visual location from the air of an object or person on the water, it is desirable to employ a water-soluble fluorescent dye which emits a yellowish-green or greenish-yellow fluorescence. For this purpose, some of the dyes from the above table such as Acridine Red 3B, Fluorescein, Phloxine and Coriphosphine O may be used. Fluorescein or its sodium salt is especially suitable for this use and is preferred because of its intense greenish-yellow fluorescence at low concentrations. On the other hand, when the compositions are employed on aqueous solutions or on bodies of water to impart fluorescence for any reason as, for example, to indicate direction of flow of such solution or water when the direction of flow is not visually apparent in the absence of such dye, then any of the water-soluble fluorescent dyes may be used. In such cases, the particular dye used may be selected largely on the basis of the particular color of fluorescence desired.

The compositions of this invention may be prepared in various ways. However, since the hydrophobic silica is water-repellent, it is usually not possible to apply the water-soluble fluorescent dye to the hydrophobic silica or particles thereof by the application of an aqueous solution of the water-soluble fluorescent dye per se to the hydrophobic silica. One suitable method of application involves the treatment of the hydrophobic silica with a two phase liquid comprising an aqueous solution of the dye and an organic liquid having the property of wetting the silica, to form a mass of pasty consistency. After the mass is dried, the resulting composition comprises hydrophobic silica particles coated with the water-soluble fluorescent dye. Another suitable method of preparing the composition comprises blending dry hydrophobic silica particles and the dry dye particles and then incorporating an organic liquid, which is capable of wetting the silica but is not a solvent for the dye, in an amount sufficient to provide a pasty mass, after which the organic liquid is removed by evaporation at regular or elevated temperatures. In such instances the composition of this invention is obtained comprising hydrophobic silica particles having a coating of the water-soluble fluorescent dye. In those instances where the water-soluble fluorescent dye is soluble in an organic liquid which is capable of wetting the hydrophobic silica, a solution of the dye in such organic liquid may be applied directly to the silica and the organic liquid may be removed by evaporation to form the composition of this invention.

In general, the compositions of this invention comprise a major proportion of hydrophobic silica and a minor proportion of the water-soluble fluorescent dye. For most purposes, the presence of from about 1 to 25% by weight of the dye, based on the dry silica, is adequate. In the case of sea-markers, it is preferred to use compositions comprising from about 3 to 15% by weight of the dye, based on the dry hydrophobic silica.

A further understanding of the compositions and methods of the present invention will be obtained from the following specific examples which are intended to illustrate this invention, but not to limit the scope thereof. Parts and percentages are by weight unless otherwise specified.

*Example 1*

A hydrophobic silica aerogel was first prepared by treating a commercial grade of hydrophilic silica aerogel (Santocel C) in an air attrition mill with an aerosol composed of ligroin and methyl silicone oil having a flash point of 578° F., a density of 8.58 pounds per gallon, a pour point below 120° F. and a viscosity in centistokes of 40 at 100° F., over a period of 25 minutes. The methyl silicone oil was employed in an amount of 15%, based on the weight of the dry silica aerogel particles. After the treatment, the silica aerogel particles contained about 10%, based on the dry aerogel, of dimethyl silicone oil, and the particles were partially hydrophobic. After the treated silica aerogel particles were heated in an oven at 120° C. for a period of 12 hours, they were completely hydrophobic, and had bulk density of about 5 pounds per cubic foot.

One part of water containing 2% of sodium fluorescein dissolved therein was combined with 3 parts of diethyl ether to form a two phase liquid which was mixed with sufficient hydrophobic silica aerogel (prepared as described in the preceding paragraph) to form a thick homogeneous paste. The paste was spread out and allowed to dry in the air at room temperature. There was thus obtained red particles of hydrophobic silica aerogel having a coating of dye, which coating comprised about 3% of the total particle weight. This powder floated on water and slowly gave an intense greenish-yellow fluorescence to the water beneath the floating particles.

*Example 2*

One part of dry, finely powdered sodium fluorescein was thoroughly blended with 10 parts of hydrophobic silica aerogel particles, prepared as described in the first paragraph of Example 1. The dry blend of dye and aerogel was then mixed with just enough diethyl ether to form a thick homogeneous paste by hand mixing with a spatula. The resulting paste was spread out and allowed to air dry.

The resulting product was a rose colored, dry, friable powder which floated on the surface of water for more than one week and slowly imparted an intense greenish-yellow color to the water beneath it. This product was suitable as a sea-marker.

*Example 3*

Products or compositions similar to those described in Examples 1 and 2 were obtained by substituting a hydrophobic silica aerogel, prepared by the procedure described in Example 1 of Kistler Patent No. 2,589,705, hereinbefore referred to, or by substituting a hydrophobic silica estersil prepared by the procedure described in Example 5 of the Iler Patent No. 2,657,149, for the hydrophobic silica aerogel employed in Examples 1 and 2 herein.

A special utility for the compositions of this invention lies in their use as sea-markers, as previously referred to herein. For such purpose, the composition is usually packaged in a waterproof container provided with a quick opening device which when actuated permits sea water to come in contact with the composition. When the composition comes in contact with the sea water it floats on the surface and the dye slowly dissolves from the hydrophobic silica thus imparting a fluorescent color to the sea water in the vicinity of the container which is readily visible from the air during daylight hours. The container containing the composition is usually attached to a person and/or to life rafts, small boats or the like. Therefore, the fluorescent color released from the composition designates the location of such person and/or object. Since the area in which the fluorescent color appears is much larger and more readily visible than such person and/or object, it is much easier to locate the area in which the person and/or object is located by visual observation from the air than the person and/or object per se.

The waterproof container may be composed of a waterproof plastic envelope having a tab seal which is readily torn off when it is desired to release the contents of the envelope to the action of sea water. Of course, the waterproof container may be made of other materials as will be apparent to those skilled in the art.

What is claimed is:

1. A composition of matter consisting essentially of particles of hydrophobic silica, which particles are capable of floating on water, and a coating on said particles of a water-soluble fluorescent dye, said coating comprising from 1 to 25% by weight of said silica.

2. A composition as in claim 1, but further characterized in that said silica is a hydrophobic ditaomaceous earth.

3. A composition as in claim 1, but further characterized in that said silica is a hydrophobic silica aerogel.

4. A composition as in claim 3, but further characterized in that the dye is sodium fluorescein.

5. A process of preparing a coated hydrophobic silica product which comprises treating particles of hydrophobic silica with a two phase liquid containing an organic liquid capable of wetting said silica and water having dissolved therein a water-soluble fluorescent dye and subsequently evaporating said liquid from said particles said dye being applied as a coating in an amount sufficient to provide from 1 to 25% by weight thereof based on said silica.

6. A process of preparing a coated hydrophobic silica product which comprises treating particles of hydrophobic silica and a water-soluble fluorescent dye with an organic liquid which is capable of wetting said silica but is not a solvent for said dye, to form a paste, and subsequently evaporating said liquid from said paste said dye being applied as a coating in an amount sufficient to provide from 1 to 25% by weight thereof based on said silica.

References Cited in the file of this patent

UNITED STATES PATENTS

| | | |
|---|---|---|
| 2,420,286 | Lacey | May 6, 1947 |
| 2,657,149 | Iler | Oct. 27, 1953 |
| 2,675,776 | Tuve | Apr. 20, 1954 |
| 2,757,098 | Berry et al. | July 31, 1956 |

FOREIGN PATENTS

| | | |
|---|---|---|
| 524,854 | Great Britain | Aug. 15, 1940 |